US010360011B2

(12) United States Patent
Acharya

(10) Patent No.: US 10,360,011 B2
(45) Date of Patent: Jul. 23, 2019

(54) PRIVATE COMPUTER NETWORK INSTALLATIONS

(71) Applicant: Oracle International Corporation, Redwood Shores, CA (US)

(72) Inventor: Kadiresan Acharya, Boulder, CO (US)

(73) Assignee: Oracle International Corporation, Redwood Shores, CA (US)

( * ) Notice: Subject to any disclaimer, the term of this patent is extended or adjusted under 35 U.S.C. 154(b) by 77 days.

(21) Appl. No.: 15/408,133

(22) Filed: Jan. 17, 2017

(65) Prior Publication Data
US 2018/0203681 A1    Jul. 19, 2018

(51) Int. Cl.
| | |
|---|---|
| *G06F 8/61* | (2018.01) |
| *H04L 29/08* | (2006.01) |
| *G06F 9/455* | (2018.01) |
| *G06F 9/50* | (2006.01) |

(52) U.S. Cl.
CPC ............... *G06F 8/63* (2013.01); *G06F 8/61* (2013.01); *G06F 9/45558* (2013.01); *G06F 9/5077* (2013.01); *H04L 67/34* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 7,802,246 B1* | 9/2010 | Kennedy | ................. | G06F 9/453 717/173 |
| 2009/0249284 A1* | 10/2009 | Antosz | ...................... | G06F 8/10 717/104 |
| 2012/0054736 A1* | 3/2012 | Arcese | ...................... | G06F 8/65 717/172 |
| 2013/0132950 A1* | 5/2013 | McLeod | ................... | G06F 8/63 718/1 |
| 2013/0167147 A1* | 6/2013 | Corrie | ................. | G06F 9/45558 718/1 |

(Continued)

OTHER PUBLICATIONS

Creating a New Virtual Machine in VirtualBox, Creating a Desktop Template Chapter 6, available online at https://docs.oracle.com/cd/E26217_01/E26796/html/qs-create-vm.html, 2012, 7 pages.

(Continued)

*Primary Examiner* — Philip Wang
(74) *Attorney, Agent, or Firm* — Kilpatrick Townsend & Stockton, LLP

(57) ABSTRACT

Software such as operating system software, firmware, and other software components may be installed onto target servers in private computer networks. In some embodiments, virtual machines and/or virtual machine images including guest operating systems and automated installation (AI) components, may be generated and configured to perform software installations onto target servers. For example, a virtual machine generator may be configured to create, install, and configure new virtual machines with specifications based on one or more target devices in a private network. An installation device in communication with the private network may store and/or execute the customized virtual machines to perform software installations onto target devices within the private network.

20 Claims, 9 Drawing Sheets

(56) References Cited

U.S. PATENT DOCUMENTS

| | | | | |
|---|---|---|---|---|
| 2015/0220324 A1* | 8/2015 | Arcese | ...................... | G06F 8/63 |
| | | | | 717/170 |
| 2015/0287273 A1* | 10/2015 | Panzarella | .......... | G07F 17/3223 |
| | | | | 463/25 |
| 2016/0098288 A1* | 4/2016 | Petrov | ................. | G06F 9/45558 |
| | | | | 718/1 |
| 2017/0206074 A1* | 7/2017 | Arcese | ...................... | G06F 8/63 |

OTHER PUBLICATIONS

Installing Oracle® Solaris 11 Systems, Part No. E21798, Mar. 2012, 204 pages.

Oracle Solaris 11 Cheat Sheet Installation and Deployment Administration, Oracle Solaris 11 Administrator's Cheat Sheet, May 11, 2012, 3 pages.

Oracle VM VirtualBox, First steps Chapter 1, available online at https://www.virtualbox.org/manual/ch01.html, Feb. 28, 2017, 24 pages.

Transitioning From Oracle® Solaris 10 to Oracle Solaris 11, Part No. E24456, Mar. 2012, 140 pages.

\* cited by examiner

PRIVATE COMPUTER NETWORK INSTALLATIONS

FIELD

The present disclosure generally relates to storage systems, and more specifically to techniques for installation of operating system software and/or related software component packages onto target servers within private computer networks.

BACKGROUND

Installation of operating systems, firmware, and other software component packages onto target devices often presents challenges with respect to computer security and system efficiency. For example, operating system installations and upgrades of a target server within a computer network may take hours of server downtime complete. Such installation process may be complicated further by multiple operating system versions and configuration options that may be applied to different servers within a network. As a result, operators of target environments, especially highly secure computer networks, may be reluctant to keep the operating systems and other software packages of their servers up-to-date, in order to reduce critical downtime or other network issues associated with the server installations and updates. On the other hand, failing to keep operating systems, firmware, or other software packages current and up-to-date may expose the network to unacceptable security risks and performance issues.

Network-based software installations are often used to install operating systems and other software packages, perform upgrades, and install security patches on target devices. For example, when installing an operating system upgrade onto a target server within a computer network, an automated installer (AI) server may be used to perform to upgrade. In such cases, the target server may connect to the AI server via one or more local networks and public networks (e.g., the Internet) an initiate the executable automated installation components within the AI server, which may handle operating system upgrade on the target server.

Alternatively, software installations may be performed manually by individual target devices using compact disks (CDs) or digital versatile disk (DVDs) containing the new software packages and the AI components to perform the installation. For example, when a target server resides on a private and/or secure computer network, and cannot access an AI server over a public network to receive the software installation, an operator of the target server may use manual installation via software CDs or DVDs.

BRIEF SUMMARY

Various techniques are described herein for installing software packages onto target servers operating within private computer networks. In some embodiments, techniques described herein may be used for installations of operating system software, firmware, and related software components onto target servers that may not have access to public networks. Accordingly, as described below in more detail, various techniques described herein may include generation of virtual machines and/or virtual machine images, including guest operating systems, and a customized set of automated installation (AI) server components to perform the software installation onto the target server, rather than techniques in which the target servers directly access automated installation servers to install the software.

In certain embodiments, techniques described herein may be implemented using a private network software installation system including an installation device configured to interface with one or more target devices. For example, an installation device may include various hardware and software components (e.g., Ethernet port or other network interfaces, processing units, and/or memory, etc.) configured to receive and store one or more virtual machines, each virtual machine including a guest operating system and automated installation (AI) server components. The installation device also may receive and store software component packages, and establish connections target devices through which the installation device may provide the target devices with access to the virtual machines. Target devices, which may include, for example, back-end storage servers may operate in a private computer network, and without access to public networks in some embodiments. Such target devices may include various hardware and software components (e.g., Ethernet port or other network interfaces, processing units, and/or memory, etc.) configured to establish connections to the installation device, access a virtual machine or virtual machine image stored on the installation device, and execute the virtual machine. The target devices also may execute the guest operating system and the automated installation (AI) server components within the virtual machine, and through the execution of these components may receive and install the software component packages for the target device.

Additionally, certain techniques are described herein for generating virtual machines and/or virtual machine images to be used for software installations on target devices in private networks. In some embodiments, a virtual machine application executing on an installation device or a separate virtual machine generator may create one or more new virtual machines, including guest operating systems and automated installation (AI) server components. The virtual machines may be packaged into virtual machine images and made accessible to the target devices. In some cases, the target devices may receive, either within or separate from the virtual machines, parameters corresponding to configuration settings that control the installation of the software component packages on the target devices. Additionally, in some embodiments, multiple virtual machines, including separate guest operating systems, AI server components, and/or configuration settings, may be stored on a single installation device and used to perform software updates for multiple different target devices within the same private network.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
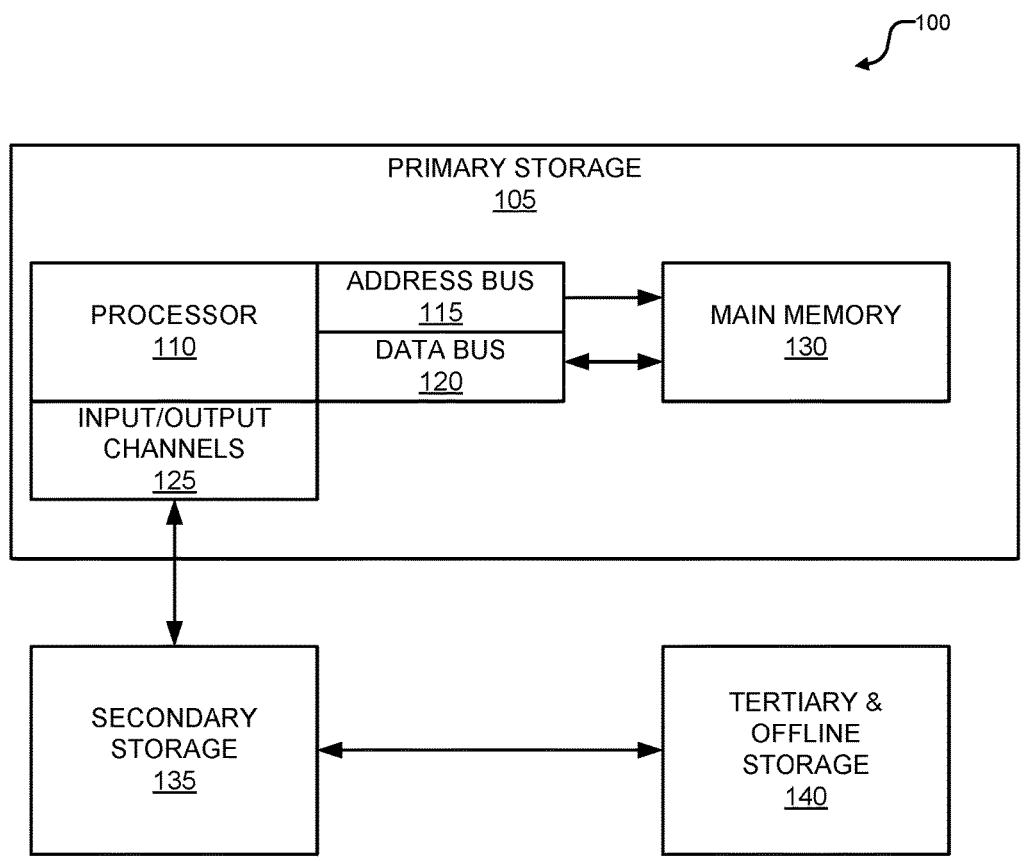
FIG. 1 is a block diagram illustrating a data storage system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Data Storage Systems

Data storage systems may include any separate or combined storage devices and/or components that are used to retain, and in some cases process, data. Without data storage systems, computing devices would be limited to the performance of certain operations and would have to immediately output the result. The use of data storage systems may allow computing devices to perform a wider range of operations, store and reference the results of performed operations (either short-term or long-term), and store and execute specialty applications for a variety of purposes. As used herein, a "storage device" may be any component or combination of components used to retain data in a data storage system.

FIG. 1 is a block diagram illustrating a data storage system 100, in accordance with some embodiments. The data storage system 100 may be included, in whole or in part, in one or more computing devices, such as personal computers (e.g., clients) or servers (e.g., hosts). The data storage system 100 may include primary storage 105, secondary storage 135, and tertiary & offline storage 140. Although shown and described as including these three different types of storage, it is contemplated that the data storage system 100 may implement more or less different types of storage, either separately or in combination. Further, although shown and described as including one of each of these different types of storage, it is contemplated that none or more than one of the different types of storage may be included. For example, in some embodiments, more than one storage device may be included in secondary storage 135.

Primary storage 105 may include a processor 110 (or more than one processor 110) and main memory 130. The processor 110 may be or include, for example, a central processing unit (CPU). The processor 110 may retrieve and manipulate data stored in the data storage system 100. Thus, in general, data stored in the data storage system 100 in close proximity to the processor 110 may be retrieved and processed fastest, while data stored in the data storage system 100 further from the processor 110 may be processed slower. However, frequently, some configurations can result in only a small amount of data being available to be stored in close proximity to the processor 110 (and in some embodiments, only temporarily), while larger storage options may generally be positioned further from the processor 110 (and may be used to permanently store data).

The processor 110 may include its own memory (not shown). The memory of processor 110 may include one or more processor registers and one or more processor caches. The processor registers may hold a small discrete amount of data (e.g., 8, 32 or 64 bits). The processor registers may take on any of a number of forms. For example, the processor registers may include one or more data registers. The processor 110 may load data from larger storage in the data storage system 100 (e.g., main memory 130) into the data registers to perform operations or manipulations on the data. The data may then be stored back to the larger storage (e.g., main memory 130). In another example, the processor registers may include one or more address registers. The address registers may hold addresses for data that may be requested by executed instructions. In still another example, the processor registers may include one or more general purpose registers. The general purpose registers may be combination registers that may store data and/or addresses. Other types of registers that may be alternatively or additionally included in the processor registers include floating point registers, status registers, constant registers, vector registers, special purpose registers, machine specific registers, internal registers, and the like. The processor registers may be the fastest type of storage available in the data storage system 100 due to its location inside the processor 110, but may be limited by a small amount of data.

The processor 110 may also include one or more processor caches. The processor caches may include one or more data caches. The data caches may store data that is frequently used. The processor caches may alternatively or additionally include one or more instruction caches. The instruction caches may store executable instructions that are frequently used. The processor caches may alternatively or additionally include a translation lookaside buffer. The translation lookaside buffer may be used to expedite virtual-to-physical address translation for executable instructions and data. Although the processor caches are also located inside the processor 110, they may be slower than the processor registers. However, the processor caches may be preferable over the main memory 130 for storage of actively or commonly used data or instructions in small amounts, as the processor caches may be accessed faster than the main memory 130.

The processor 110 may be directly or indirectly coupled to the main memory 130 over an address bus 115 and a data bus 120. When requesting certain data from the main memory 130, the processor 110 may send a memory address to the main memory 130 over the address bus 115. The memory address may indicate the location of the data being requested. The processor 110 may then read the data from the main memory 130 over the data bus 120. The processor 110 may alternatively or additionally write data to the main memory 130 over the data bus 120.

The main memory 130 may include, for example, random access memory (RAM), such as dynamic RAM (DRAM), static RAM (SRAM), synchronous DRAM (SDRAM), or any other type of volatile storage. "Volatile" storage, as used herein, may refer to a characteristic of storage devices that do not retain their contents when not supplied with power and thus are uninitialized upon booting up (e.g., temporary storage). In other words, volatile storage may require a constant source of power to retain stored data. Although the main memory 130 may be volatile, access to data stored therein is generally faster than that stored in secondary storage 135 or tertiary & offline storage 140 due to its close proximity to the processor 110. In some embodiments, the primary storage 105 may also include non-volatile storage, such as read only memory (ROM).

The processor 110 may use input/output channels 125 to access the secondary storage 135. The secondary storage 135 may include, for example, hard disk drives, flash memory, or any other type of non-volatile storage. "Non-volatile" storage, as used herein, may refer to a characteristic of storage devices that retain their contents when powered down, and data may be stored therein temporarily or permanently. The secondary storage 135 may have one or more file systems stored thereon that may provide a hierarchy of files and directories stored in the secondary storage 135, as described further herein with respect to FIG. 3. In some embodiments, the secondary storage 135 may also include volatile storage, such as RAM disks.

In some embodiments, the primary storage 105 is collocated with the secondary storage 135, e.g., on a single computing device. However, it is contemplated that in some embodiments, the primary storage 105 may be located remotely from the secondary storage 135, e.g., on two or more different computing devices. For example, the secondary storage 135 may be located at a host, while the primary storage 105 may be located at a client. The client may issue commands to retrieve and access data stored on the secondary storage 135 at the host using the processor 110 of the primary storage 105 at the client.

Tertiary & offline storage 140 may include tertiary storage, such as removable mass storage media used to store large amounts of data that is not accessed often, but may be accessed without human intervention using robotic technologies. Tertiary & offline storage 140 may alternatively or additionally include offline storage, such as removable storage media that may not be accessed without human intervention, such as CD-ROMs, CD-RWs, DVDs, floppy disks, Universal Serial Bus (USB) flash drives, and the like. Offline storage may be recorded and physically disconnected from the data storage system 100. Although shown as being in communication with the secondary storage 135, it is contemplated that the tertiary & offline storage 140 may alternatively or additionally be in direct communication with the primary storage 105.

File Systems

A storage device of a data storage system may implement one or more file systems to organize the data stored thereon.

Figure 2:
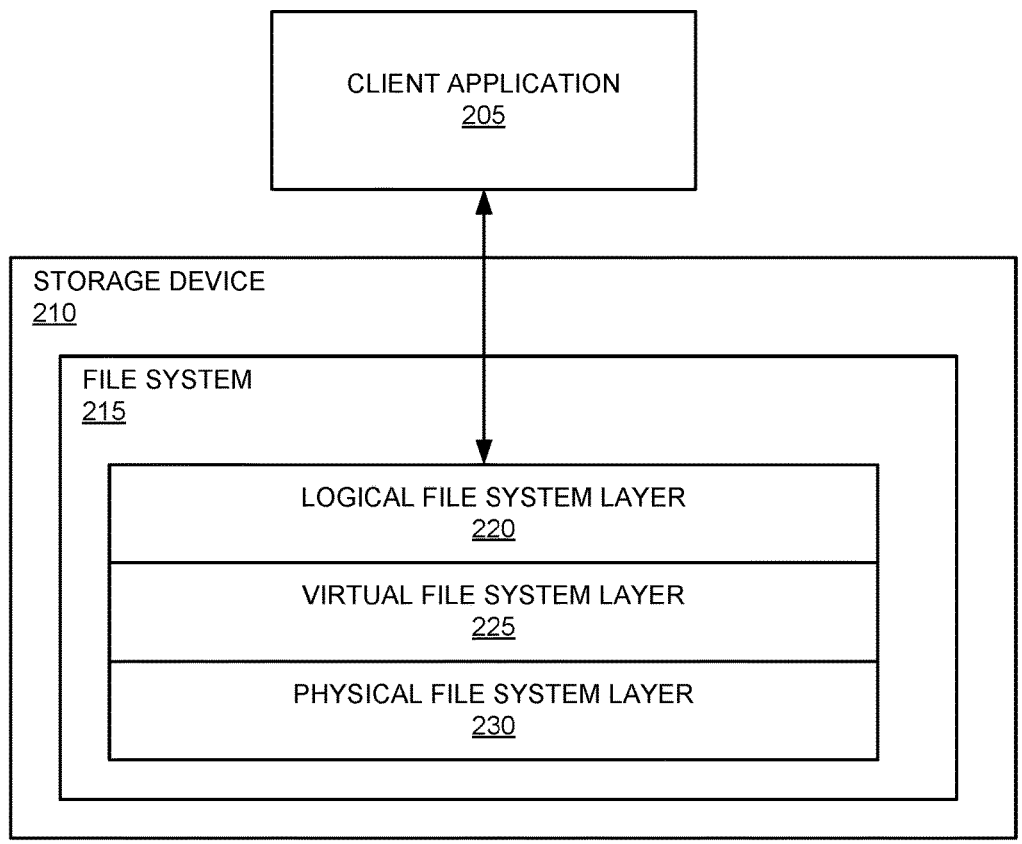
FIG. 2 is a block diagram illustrating the layers of a file system of a storage device, in accordance with some embodiments.
Figure 3:
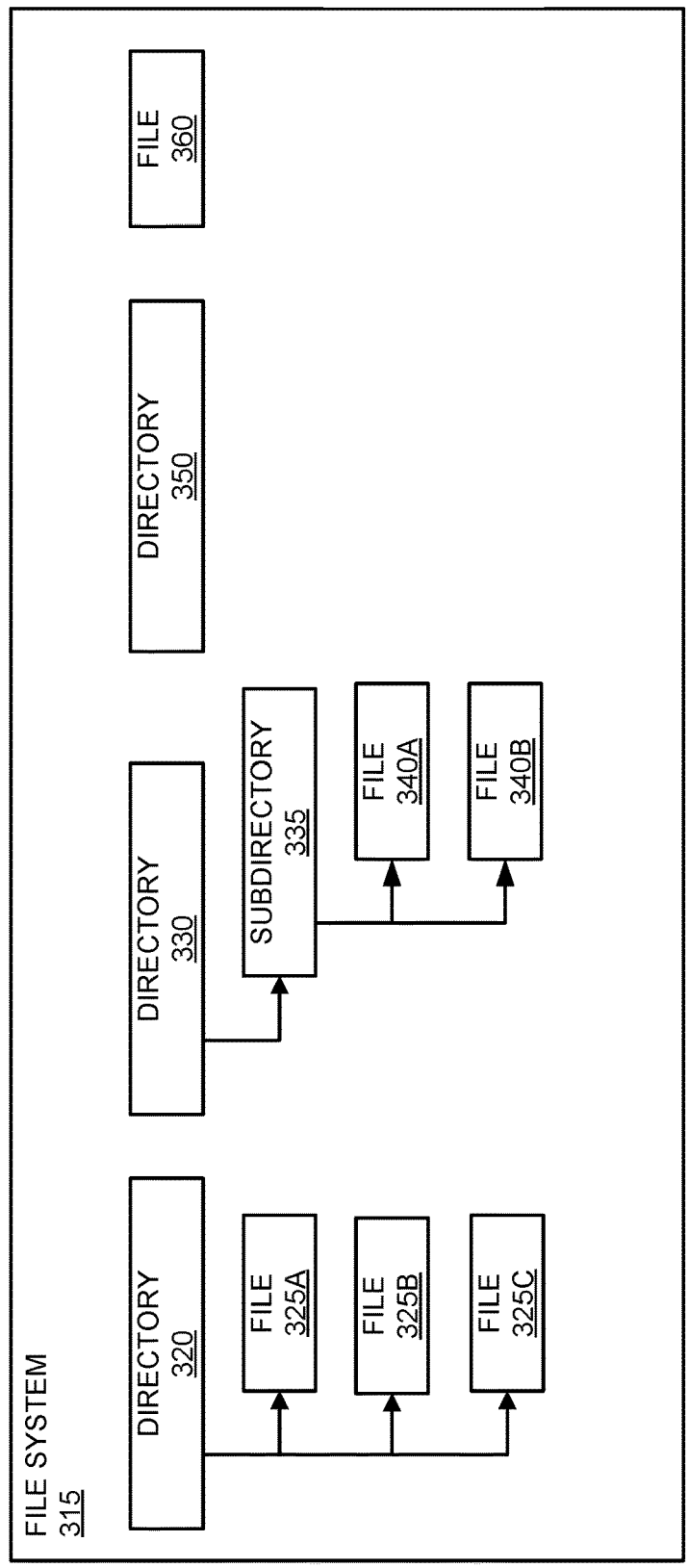
FIG. 3 is a block diagram illustrating a hierarchy for data stored or mounted in a file system, in accordance with some embodiments.

As used herein, a "file system" may refer to a structure or organization of files or directories, and a "file" may refer to a group of data. Each file may be associated with a filename that allows that file to be uniquely identified and located. A number of different file systems may be used depending on the specific requirements and desired applications. FIGS. 2 and 3 illustrate exemplary file systems that may be implemented on a storage device.

FIG. 2 is a block diagram illustrating the layers of a file system 215 of a storage device 210, in accordance with some embodiments. The file system 215 may have three layers: a logical file system layer 220, a virtual file system layer 225, and a physical file system layer 230. Although shown and described as having these three layers, it is contemplated that fewer or more layers may be used. For example, in some embodiments, the functions of the logical file system layer 220, the virtual file system layer 225, and the physical file system layer 230 may be combined into a single layer. In some embodiments, the virtual file system layer 225 may be omitted.

The logical file system layer 220 may interact with the client application 205 to process requests for data. The logical file system layer 220 may provide the application programming interface (API) for file access and operations (e.g., open, close, read, write, etc.). The logical file system layer 220 may receive the requested operation and may pass it to the virtual file system layer 225 to be passed to the physical file system layer 230.

The logical file system layer 220 may provide a consistent view of multiple physical file systems that may be defined by multiple file system implementations. This consistency may be provided by the abstraction of the physical file system layer 230 that is implemented by the virtual file system layer 225. The abstraction may specify a set of operations that a given implementation should include in order to carry out file system requests received through the logical file system layer 220. Thus, the abstraction carried out by the virtual file system layer 225 may provide a uniform interface to the logical file system layer 220.

In other words, the virtual file system layer 225 may provide support for multiple different physical file systems. The virtual file system layer 225 may allow the client application 205 to access different types of file systems in a uniform way. For example, the virtual file system layer 225 may allow the client application 205 to access file systems on both local storage devices and network storage devices, file systems for different operating systems (e.g., Windows, Mac OS, Unix, etc.), file systems of different types (e.g., Unix file system (UFS), network file system (NFS), etc.), and the like.

The physical file system layer 230 may process the requested operation on a file (e.g., read, write, etc.). The physical file system layer 230 may physically place files in specific locations on the storage device 210. The physical file system layer 230 may interact with the drivers of the storage device 210 to physically operate the storage device 210.

FIG. 3 is a block diagram illustrating a hierarchy for data stored or mounted in a file system 315, in accordance with some embodiments. In some embodiments, data may be physically stored in the file system 315 according to the hierarchy shown in FIG. 3, such as in a Windows operating system (using file systems such as, e.g., FAT, NTFS, exFAT, Live File System, ReFS file system, etc.). In some embodiments, data may instead be physically stored under a single root directory. The file system 315 may be "mounted" by informing the operating system where in the hierarchy certain files should appear. These embodiments may be implemented in a Unix or Unix-like operating system.

The file system 315 may include one or more directories (e.g., directories 320, 330, 350), one or more subdirectories (e.g., subdirectory 335), and one or more files (e.g., files 325A-C, 340A-B, 360). Directories (which may also be referred to herein as "folders") may group files into separate collections. For example, directory 320 may include files 325A-C. Directories may also include subdirectories. For example, directory 330 may include subdirectory 335, and subdirectory 335 may include files 340A-B. Directories may also be created without any files (e.g., directory 350). Files may also be located in the file system 315 without an associated directory (e.g., file 360).

File (e.g., files 325A-C, 340A-B, 360) within the file system 315 may have associated metadata. The metadata may be stored separately from the file (not shown). The metadata may include, for example, the amount of data in the file, a file timestamp (e.g., the last time the file was modified, when the file was created, the time the file was last backed up, and/or when the file was last accessed), a user ID, access permissions, file attributes (e.g., read only, read/write, etc.), and the like.

Network Devices

Figure 4:
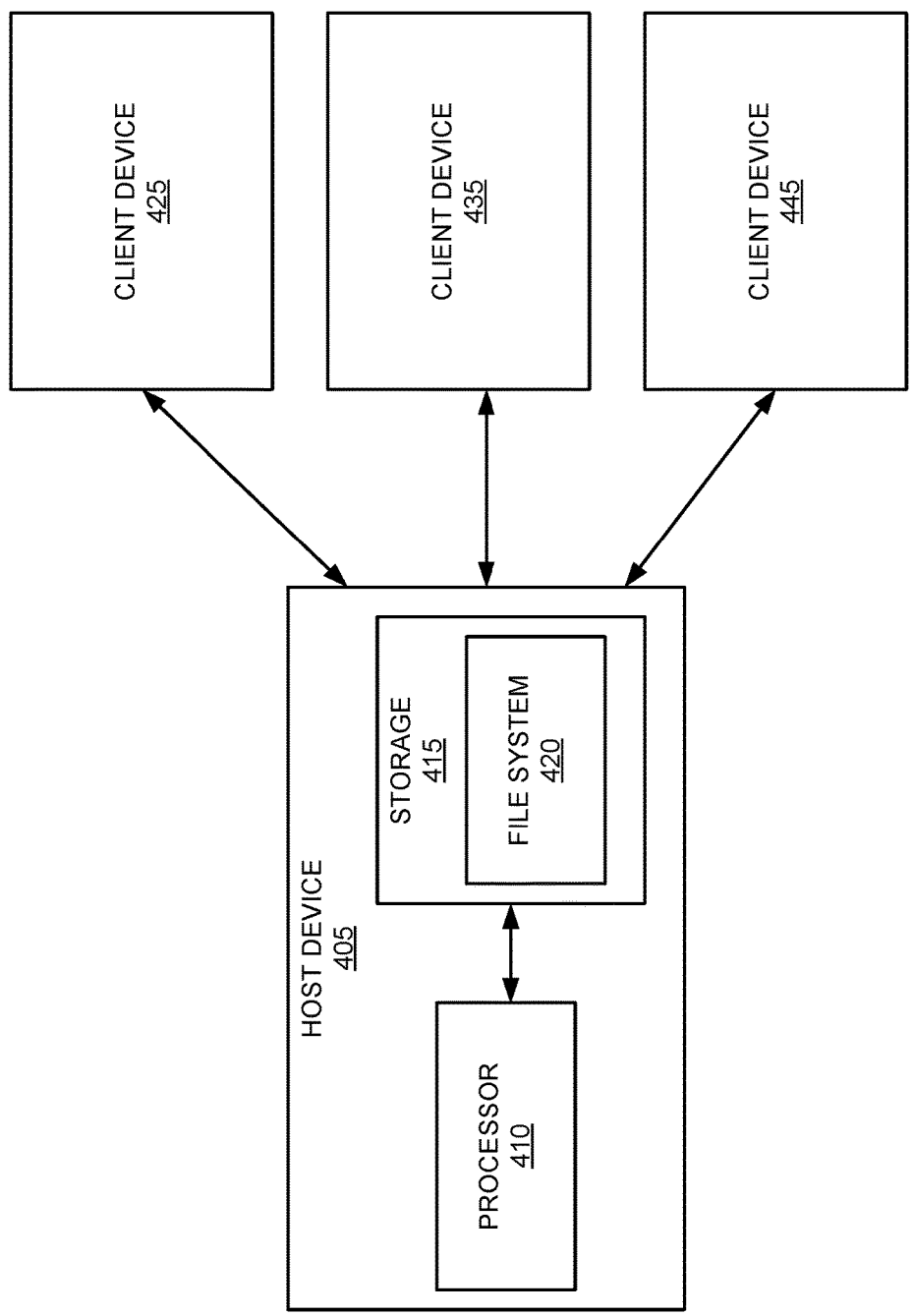
FIG. 4 is a block diagram illustrating a host device in a network, in accordance with some embodiments.

Data storage systems may be implemented as network devices accessible by client devices over a network. FIG. 4 is a block diagram illustrating a host device 405 in a network, in accordance with some embodiments. The host device 405 may be a host storage device, host computing device (e.g., a host server), and/or host data storage system. The host device 405 may include a processor 410 and storage 415. The processor 410 may be similar to the processor 110 of FIG. 1. The storage 415 may include primary storage 105, secondary storage 135, and/or tertiary & offline storage 140 of FIG. 1. The storage 415 may include a file system 420, which may be similar to file system 215 of FIG. 2 and/or file system 315 of FIG. 3. As discussed herein with respect to FIG. 1, it is contemplated that in some embodiments, processor 410 of host device 405 is not necessary, and respective processors of client devices 425, 435, 445 may be used to process requests for data from host device 405.

The host device 405 may communicate over a network with the client devices 425, 435, 445. The host device 405 may communicate with the client devices 425, 435, 445 through any standard data connection, including but not limited to an Internet connection. This may include a wireless channel (e.g., a Wi-Fi connection), a wired connection (e.g., DSL, cable modem, etc.), or a combination of both. The client devices 425, 435, 445 may utilize the host device 405 to store data, define rules, set permissions, and the like. The host device 405 may also be in communication with one or more user devices (not shown). The user devices may utilize the host device 405 to request and/or use data. In addition, although shown and described as being in communication with three client devices 425, 435, 445, it is contemplated that host device 405 may be in communication with any number of client devices in this embodiment.

The host device 405 may store data that may be requested by and transmitted to the client devices 425, 435, 445 for any purpose. In these embodiments, data that may be requested from the host device 405 may be referred to as a "share", i.e., a resource that may be made available by one device to other devices. For example, the client devices 425, 435, 445 may be requesting an application or service. In another example, the host device 405 may be performing migration of one or more files, file systems, and/or databases to one or more of client devices 425, 435, 445.

Software Installations within Private Computer Networks

As discussed below in detail, various techniques (e.g., systems, methods, computer-program products tangibly embodied in a non-transitory computer-readable storage medium, etc.) are described herein for installing software onto a target server within a private computer network. Some embodiments described herein may be used for installing operating system software, firmware, and/or related software components onto target servers that might not have access to public networks. Accordingly, as described below in more detail, various techniques described herein may include generation of virtual machines and/or virtual machine images (which may also be referred to as "virtual appliances") including guest operating systems and a set of automated installation (AI) server components configured to perform the software installation onto the target server.

In some embodiments, the techniques described herein may be implemented using a private network software installation system including an installation device configured to interface with one or more target devices. For example, an installation device may include various hardware and software components (e.g., Ethernet port or other network interfaces, processing units, and/or memory, etc.) configured to receive and store one or more virtual machines, each virtual machine including a guest operating system and automated installation (AI) server components. The installation device also may receive and store software component packages, and may establish connections target devices through which the installation device may provide the target devices with access to the appropriate virtual machines. Target devices may include, for example, back-end storage servers operating in a private computer network that might not have access to public networks. Such target devices may include various hardware and software components (e.g., Ethernet port or other network interfaces, processing units, and/or memory, etc.) configured to establish connections to the installation device, access a virtual machine stored on the installation device, and execute the virtual machine. The target devices also may execute the guest operating system and the automated installation (AI) server components within the virtual machine, and through the execution of these components may receive and install the software component packages for the target device.

Additionally, a virtual machine application executing on an installation device, or on a separate virtual machine generator, may create new virtual machines, including guest operating systems and automated installation (AI) server components. The created virtual machines may be packaged into virtual machine images and made accessible to the target devices. In some cases, the target devices may receive, either within or separate from the virtual machines, parameters corresponding to configuration settings that control the installation of the software component packages on the target devices. Additionally, in some embodiments, multiple virtual machines and/or images, including separate guest operating systems, AI server components, and/or configuration settings, may be stored on a single installation device and used to perform software updates for multiple different target devices within the same private network.

Thus, certain aspects of the present disclosure involve systems and methods for enabling installation of operating systems and associated software packages in a pre-packaged virtual machine bundle, on one or more target machines of a target network. In some embodiments, the target network may comprise a private and/or secure and/or restricted network environment, such as secure financial network, corporate network, governmental network, etc., in which public or local network access might not available or cannot be granted for the purpose of a simplified pre-boot environment. Accordingly, certain embodiments describe a pre-packaged bundle that is used to customize a virtual appliance setup, that may be loaded directly onto an installation device, or onto a transport device (e.g., a laptop or portable storage device) to be connected to devices within the target network via an Ethernet port, in order to install operating systems, updates, and other software packages on the devices of the target network.

For example, in some embodiments, the components of an operating system and an auto-installation (AI) server may be delivered inside a virtual machine using a virtual machine application. Thus, the need of a target server receiving the software installation to access a host network of a software provider while initiating installations within the target environment, and/or configuring AI servers at the target network, may be reduced or eliminated. In some cases, the components used for an installation server, software, and scripts may be packaged together and delivered as a ready-to-deploy virtual appliance, with a virtual machine customized and suitable for a restricted and remote target environment. Thus, the virtual machines described herein may allow for more secure, more efficient, and/or simpler techniques for transmitting and installing operating systems and other software components within private and/or secure computer networks. Further, the techniques disclosed herein may be operable to update software packages for multiple devices within a private and/or secure network simultaneously. Such simultaneous software installations may provide certain advantages over conventional sequential upgrades, which may require old files to be maintained due to format changes and may affect performance.

Figure 5:
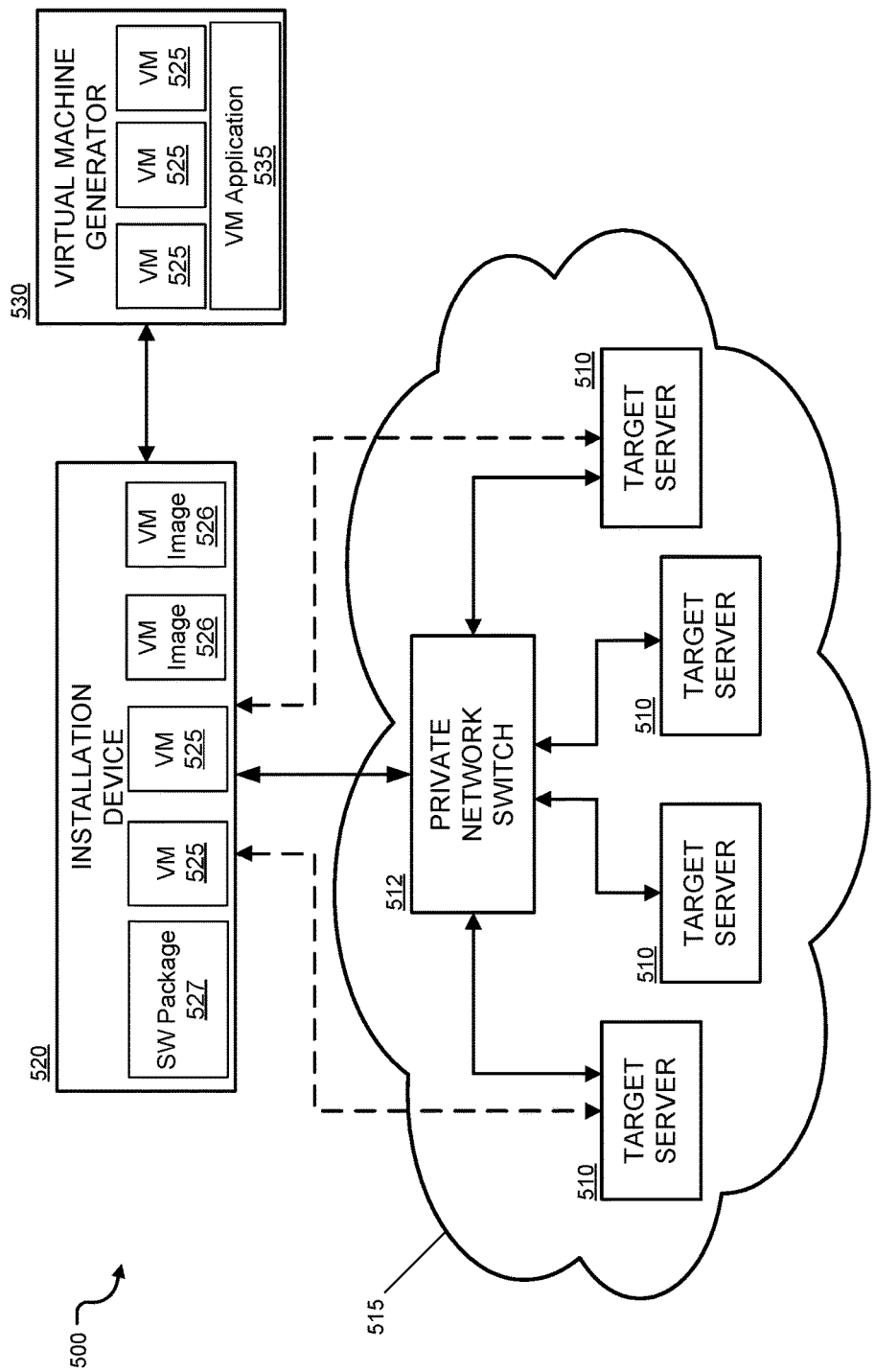
FIG. 5 is a block diagram illustrating an example computer network software installation system, the system including an installation device and target devices, in accordance with one or more embodiments of the disclosure.

Referring now to FIG. 5, a block diagram is shown illustrating an example of a computer network software installation system. As shown in this example, system 500 may include a virtual machine generator 530, an installation device 520, and one or more target devices 510 operating within a computer network 515. As discussed below in more in more detail, the devices and components within system 500 may be used to generate virtual machine and/or virtual machine images, and use the virtual machines to perform installations of operating system software and software component packages onto the target servers 510. In some embodiments, the virtual machine generator 530 may be configured to generate virtual machines including guest operating systems and automated installation (AI) server components, which may be packaged into virtual machine images (or virtual appliances), and provide the virtual machines to the installation device 520. Installation device 520 may store one or more virtual machines 525 and/or virtual machine images 526, and provide the virtual machines/images to the appropriate target servers 510 within a private network 515. Target servers 510 may access the virtual machines 525, execute the virtual machines and AI server components to initiate software installation processes on target servers 510.

In order to perform these features and other functionality described herein, each of the components and sub-components discussed in the example computer network software installation system 500 may correspond to a single computer server or a complex computing system including a combination of computing devices, storage devices, network components, etc. Each of these components and their respective subcomponents may be implemented in hardware, software, or a combination thereof. As shown in this example, in certain cases an installation device 520 may communicate directly with target servers 510, while in other cases an installation device 520 may communicate indirectly via one or more intermediary network components, such as network switch 512 and/or other network routers, gateways, firewalls, etc. Although the physical network components have not been shown in this figure so as not to obscure the other elements depicted in the figure, it should be understood that any of the network hardware components and network architecture designs may be implemented in various embodiments to support communication between the servers and devices in the system 500.

Further, the servers and devices within the system 500 may be integrated within, or configured to operate in collaboration with, the data storage systems described above in reference to FIGS. 1-4. For example, in some embodiments, each of the target servers 510 may correspond to a primary storage 105 within a data storage system 100 (e.g., a secure network-based storage system 515), and/or a storage device 210 implemented with file system storage layers, as discussed above in reference to FIGS. 1-3. Additionally, with respect to the storage, transmission, and installation of software components onto the target servers 510, each target server 510 may correspond to a client device 425, while the installation device 520 (and/or virtual machine generator 530) corresponds to a host device 405, as discussed above in reference to FIG. 4.

As noted above, techniques described herein include the generation, customization, and packaging of virtual machines for performing software installations on private computer networks. Virtual machines may be generally understood as self-contained or isolated operating environments that operate as though they are separate physical devices/systems. Virtual machines may be created using one or more virtual machine development applications. In some cases, a virtual machine may function as though it has control and access over an entire device where the virtual machine is installed or being accessed. Virtual machines may communicate with the hardware of a device via a virtual machine monitor (VMM) control program, which may "virtualize" the hardware for each virtual machine. Thus, virtual machines may enable different operating systems having different applications to run in the same computer at the same time without interfering with one another. In some cases, a virtual machine may be described or defined in terms of a set of parameters that define the behavior of the virtual machine. These parameters may include hardware settings, for example, the amount of memory made available to the virtual machine, the specific hard disks virtualized for the virtual machine and through which container files, which CDs are mounted etc., as well as a set of state information, such as the current operating state of virtual machine (e.g., currently running, saved, available snapshots, etc.). The parameters representing a virtual machine descriptions and current operating state may, in some embodiments, be stored entirely in plain-text XML files for easy portability and easy folder sharing. The virtual machine application 535 also may include functionality for allowing installation of software on a virtual machine that grants extra privileges to the host machine; for tasks like sharing files, sharing drives and peripherals, and the like.

Once a virtual machine is installed, its virtual hard disks may be considered a "container" that may be arbitrarily frozen, woken up, copied, backed up, and transported between different hosts. Additionally, with some virtual machine applications, such "snapshots" can correspond to a virtual machine image that allows for a particular virtual machine and its current operational state to be saved and reverted back to that state, if necessary. With respect to virtual machine operating systems, the operating system of the physical computer on which the virtual machine is installed is generally referred to as a host operating system, while the operating systems that are running inside virtual machines are generally referred to as guest operating systems.

In various embodiments, virtual machine generator 530 may be implemented using one or more computing devices, such as laptop computers, computer servers, mainframes, personal computers, thin clients, tablet computers, smart phones and other mobile devices, or the like. The virtual machine generator 530 may include a virtual machine application 535 that is capable of generating and configuring virtual machines. In some cases, the virtual machine generator 530 may be configured to access local and public networks as needed, even when such networks are inaccessible to devices within the target network 515. The virtual machine generator device 530 may configured to create one or more virtual machines, using the virtual machine application 533, which may be installed on the virtual machine generator 530 and configured with adequate storage and memory to download or install at least one operating system and/or other software component packages. For example, in some cases, the virtual machine generator 530 may be a computer system executing a host operating system, such as a WINDOWS® operating system. In other examples, the virtual machine generator 530 may executed one or more of a LINUX® or a MACINTOSH® operating system. In some examples, the virtual machine generator 530 may include a SOLARIS® server.

Similar to the virtual machine generator 530, the installation device 520 may be implemented using one or more computing devices, such as laptop computers, computer servers, mainframes, personal computers, thin clients, tablet computers, smart phones and other mobile devices, or the like. Additionally, in some embodiments, the installation device 520 may be configured to executing aspects of the virtual machines created by the virtual machine generator 530. As noted above, such virtual machines may be pre-packaged with operating systems, AI server components, and/or other software components to be delivered to a target. Thus, when an installation device 520 executes the virtual machines, it may include adequate storage and memory to download or install at least one operating system and/or other software packages. Like the virtual machine generator 530, the installation device 520 may execute a host operating system, such as a WINDOWS®, LINUX®, or MACINTOSH® operating system. In some examples, the installation device 520 may include a SOLARIS® server.

As shown in this example, the installation device 520 may be implemented as a separate computing device from the virtual machine generator 530. However, in some embodiments, the virtual machine generator 530 and the installation device 520 may be implemented as a single computing device/system. In either case, the installation device 520 may include the necessary specialized hardware and/or software components to communicate (directly or indirectly) with the target servers 510 in network 515. As discussed below, the installation device 520 may be used to download operating systems and other software packages to the target server 132 using virtual machines 525 executing on the installation device 520 and/or virtual machine images

526 stored on the installation device 520. To illustrate, the installation device 520 in some cases may be laptop computer or mobile devices of a field engineer responsible for distributing software upgrades and installations to remote secure customer locations, such as the target network 515. In some embodiments, the installation device 520 may be used simply as a transport device (e.g., a flash drive or other portable storage device) used to provide the properly configured virtual machine images 526 to the devices within the target network 515. In other embodiments, the installation device 520 may be configured to execute virtual machines 525, and/or to store virtual machine images 526, which may be received via a communication network or a transport device, from a separate device that created the virtual machines 525 and virtual machine images 526, such as the virtual machine generator 530.

Although the virtual machine application 535 is shown within the virtual machine generator 530, the same or a different virtual machine application 535 also may operate within the installation device 520 (e.g., to generate and/or execute virtual machines 525 and virtual machine images 526) and/or within the target servers 510 (e.g., to execute virtual machines 525 and virtual machine images 526). In some embodiments, the virtual machine application 535 may include a cross-platform virtualization application for creating and configuring virtual machines 525. In some cases, the virtual machine application 535 may be installed on the device 530 (and/or the installer device 520), regardless of whether the host device is running a WINDOWS®, MAC®, LINUX®, SOLARIS®, or other (host) operating systems. The virtual machine application 535 may extend the capabilities of the virtual machine generator device 530 (and/or the installer device 520) to create virtual machines 525, allowing these devices 520 and 530 to run multiple guest operating systems, inside multiple virtual machines, at the same time. For example, a user of the virtual machine generator 530 and/or the installer device 520 may simultaneously run both WINDOWS® and LINUX® operating systems on the device (and/or other operating systems), each of which may execute alongside existing software applications. Further, a virtual machine application 535 may enable virtual machine generator 530 (and/or installer device 520) to execute software written for different operating system without having to reboot to use the software. The virtual machine application 535 may also allow users to configure the virtual hardware available to each guest operating system, thereby specifically tailoring the virtual environments for each virtual machine 525. Thus, in some embodiments, using the virtual machine application 535, a virtual machine 525 (or virtual machine image 526) may be specifically configured to comport to the particular hardware specifications on a particular target server 510 within the target network 515. Finally, while this example shows three virtual machine instances 525 executing within the virtual machine generator 530, two virtual machine instances 525 executing within the installer device 520, and two virtual machine images 526 stored on the installer device 520, it should be understood that virtual machine generators 530 and installer devices 520 may install and execute any number of virtual machines, depending upon practical limits of disk space and memory within the devices.

As noted above, a virtual machine application 535 executing on the virtual machine generator 530 (and/or an installer device 520 or target server 510) may be used to export entire software configurations, including an operating system, from one location to another. Using the virtual machine application 535, a complex software setup, including a new operating system or operating system upgrades/patches, along with other software applications or components, may be packaged into a virtual machine image 526 (also referred to as a "virtual appliance"). Virtual machine images 526 are not currently executing virtual machines 525, but include all of the stored data necessary to be installed and executed as a virtual machine by a hypervisor or other virtual machine application 535. Thus, virtual machine images 526 may be transmitted over communication networks like files, or may be transported from device to device using a flash drive or other portable storage device.

Computer network 515, in this example, includes a network switch device 512 and several target servers 510. As noted above, network 515 may be implemented as a private computing environment, such as secure and restricted corporate network or governmental network. Thus, target servers 510 may be remote and isolated from (e.g., restricted or physically disconnected) the virtual machine generator device 530, and may be unable or restricted from accessing virtual machine generator 530 over a public or local network to receive software packages. In various embodiments, network 515 may include a plurality of servers (e.g., back-end storage servers), mainframes, desktop terminals, personal computers, etc. As discussed below, each target server 510 (or any other devices in the private network 515) on which software installation is to be performed, may require some channel of communication with the installation device 520 in order to receive the software components. However, because the devices in the network 515 might not be able to communicate directly with the installation device 520 (e.g., based on network security features, or because direct access between the devices is not available), a target server 510 instead may communicate with the installation device 520 (or a portable storage device storing one or more virtual machine images 526) via a direct or indirect communication link. In some embodiments, an Ethernet connection may be established between a target server 510 and installation device 520, for example, by coupling a Category 5 cable or the like to an Ethernet port of the target server 510. Such communication links are not limited to Ethernet connections using Category 5 cables, but may include DSL/ADSL via Category 3 cables, T1, T3, or partial variants via Category 5 cable, and/or fiber optic cable. Additionally, the installation device 520 (or portable storage device storing virtual machine images 526) may communicate with the target server 510 and additional devices within target device network 515, for example, by using a portable installation device 520 (e.g., a laptop computer) that may transport one or more virtual machines 525 to the physical location of the target server 510. In such embodiments, the communication link between the installation device 520 and target server 510 may comprise an Ethernet connection or other similar connection in which the devices are coupled directly at the physical location of the target server 510. In other embodiments, the communication links between the installation device 520 and target server 510 may wireless communication links including Wi-Fi, Bluetooth, or the like. Such connections may be performed directly, or indirectly through the network switch 512 of the private network 515.

As discussed in greater detail below, the virtual machine generator 530 and/or the installation device 520 may access or execute the virtual machine application 535 to create virtual machines 525 and virtual machine images 526. These virtual machines 525 and virtual machine images 526 may include sets of parameters used to install a new operating system, operating system upgrades or patches (e.g., security patches, bug fixes, etc.), and/or additional software packages, onto target servers 510. Additionally, once a particular virtual machine 525 is created, it may be packaged into a virtual machine image (or virtual appliance) and then exported, transmitted, and/or duplicated one or more times to various devices such as installation devices 520 or non-computer external storage devices such as a universal serial bus (USB) flash drives capable of storing the virtual machine image 526 for transport to the remote location of a target server 510 or network switch 512.

Figure 6:
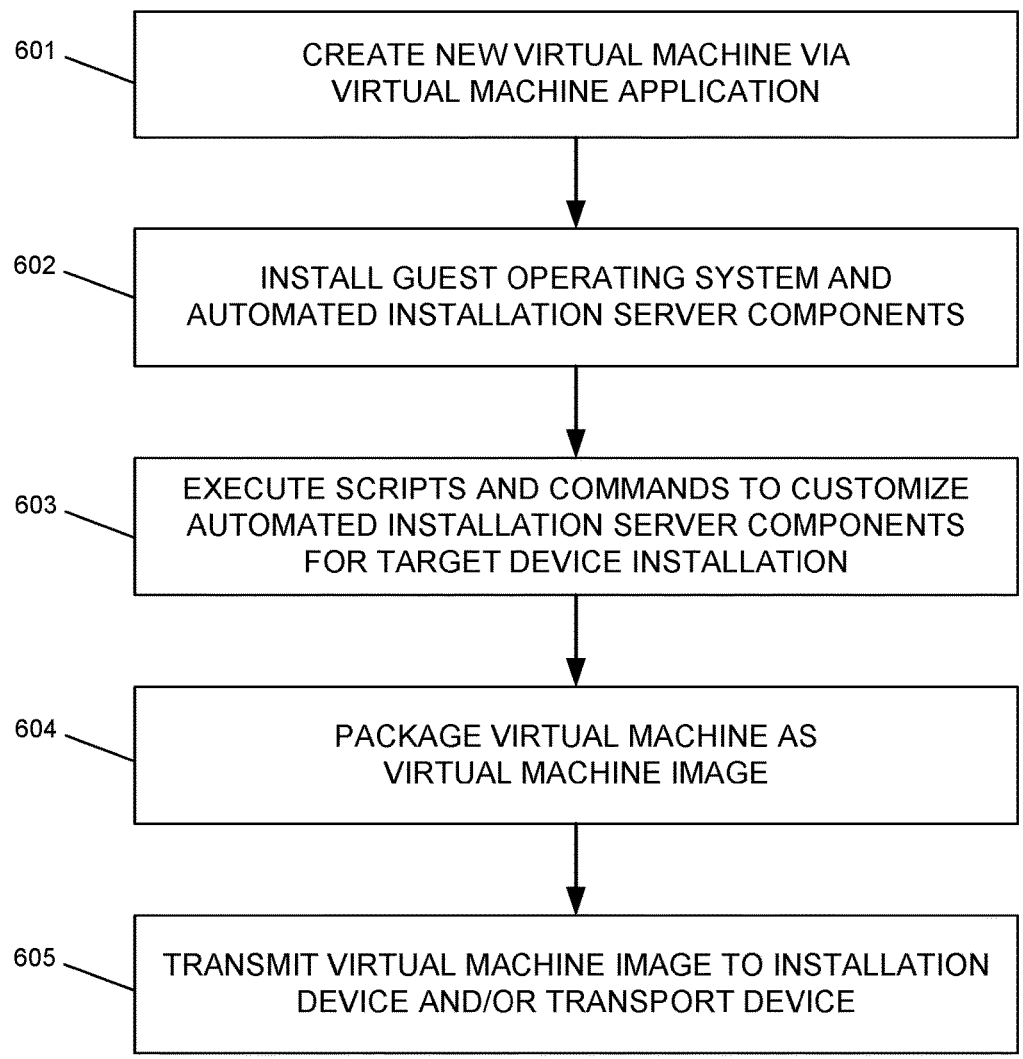
FIG. 6 is a flow diagram illustrating an example process of generating and providing virtual machines to installation and/or transport devices, for performing software installations on target devices, in accordance with one or more embodiments of the disclosure.

Referring now to FIG. 6, a flow diagram is shown illustrating an example process of generating and providing virtual machines to installation and/or transport devices, for performing software installations on target devices. As described below, the steps in this process may be performed by one or more devices/components in the computer network software installation system 500 described above, such as the virtual machine generator 530 and/or installation device 520. However, it should be understood that the various features and processes described herein, including generating and configuring virtual machines to perform software updates on target servers 510, packaging the virtual machines into customized virtual machine images, and providing virtual machine images to installation devices 520, need not be limited to the specific computer systems and hardware implementations described above in FIGS. 1-5.

In step 601, a virtual machine generator 530 may create a new virtual machine 525 using a virtual machine application 535. As noted above, in some embodiments, virtual machine generator 530 and the installation device 520 may be implemented as a single computing device/system. During the creation of the virtual machine, or during a subsequent configuration/re-configuration of the virtual machine, the virtual machine generator 530 may use a set of configuration parameters that define the hardware capabilities (e.g., processors, memory, etc.) that will be made available to the virtual machine. In various examples, these virtual hardware specifications may be selected manually (e.g., via user input) or may be determined automatically by the virtual machine generator 530 (e.g., by communicating with a target server 510 or other server), and may be selected/determined so as to match the actual hardware specifications of one or more of the target servers 510.

In step 602, the virtual machine created in step 601 may be built up by installing various software components, such a guest operating system and automated installation (AI) server components. In some cases, additional software applications and packages may be added to the virtual machine as well. The operating system/AI components/software packages may be added to the virtual machine 525 during the process of generating the virtual machine 525 in step 601, or may be performed subsequently in a separate process in step 602. As noted above, the guest operating system installed on the virtual machine 525 may be of any operating system type (e.g., WINDOWS®, MAC®, LINUX®, SOLARIS®, etc.) and any version and/or build of the selected operating system may be installed. For example, the operating system may be selected to correspond to the operating system installed on a particular target server 510, so that a new operating system version, upgrade, or patch may be installed seamlessly on the particular target server 510 using the virtual machine 525.

In order to install the automated installation (AI) server components onto the new virtual machine 525, the virtual machine generator 530 may include an automated installation, which may either be installed locally on the virtual machine generator 530 server, or may be accessible via a public network. In step 602, the virtual machine generator 530 may access the services of such an AI server, and then install certain AI components onto the newly created virtual machine 525, so that these components may be used for automated installation of one or more software packages onto one or more target servers 510. The services/components of an AI server that may be installed onto the virtual machine 525 may include one or more of: a dynamic host configuration protocol (DHCP) service, an automated install service, an image packaging system (IPS) repository service, and/or custom installation scripts. In step 602, one or more of these AI components may be installed onto the virtual machine 525, integrated with the virtual machine 525, or otherwise accessed by the virtual machine 525, to allow the virtual machine 525 to perform automated installation of an operating system and/or software packages onto a target server 510.

In step 603, one or more scripts and/or commands may be executed by the virtual machine generator 530 to customized the automated installation (AI) components installed on the newly created virtual machine 525, thereby configuring the virtual machine 525 to perform customized operating system and/or software package installations onto a target server 510. In some embodiments, the customization within step 603 may including executing a plurality of scripts to configure the virtual machine 525 to implement a virtual library extension (VLE) installation onto a target server 510. Implementing a custom VLE installation, or otherwise customizing the AI server components within the virtual machine 525 for automated installation of an operating system and/or software packages, may allow the virtual machine 525 to be perform a customized installation that addresses the specific hardware and software specifications of a particular target server 510 (or servers) within the target network 515.

In step 604, the virtual machine generator 530 may package the newly created virtual machine 525 into a virtual machine image 526, and in step 605 the virtual machine image 526 may be transmitted to a separate installation device 520. For example, as described above, the virtual machines 525 installed on the virtual machine generator device 530 may be defined as a set of parameters that define their capabilities and behaviors, including hardware settings (e.g., memory available to the virtual machine, the specific hard disks virtualized for the virtual machine and through which container files, which CDs are mounted etc., as well as a set of state information, such as the current operating state of virtual machine (e.g., currently running, saved, available snapshots, etc.). The virtual hard disks of a virtual machine 525 may be considered a "container" that may be frozen (or hibernated) and then woken up to resume execution of the virtual machine. Such virtual machine containers also may be copied, backed-up, and transmitted to other host systems (e.g., the installation device 520) to be stored, and then executed within their new host system environment. These virtual machine images also may allow for particular virtual machines, as well as the current operational states of the virtual machines, to be saved and reverted back to that state, if necessary.

Additionally, in some embodiments, step 604 may be optional and the newly created virtual machine 525 need not be packaged into a virtual machine image 526. For example, in some cases, a virtual machine 525 may be generated, installed with various software, and configured as described in steps 601-603, directly onto an installation device 520, and thus need not be transferred at all between devices. In other cases, the virtual machine 525 may be created on a first host system (e.g., virtual machine generator 530) and moved to a new host system (e.g., one or more installation devices 520) using various techniques for transferring virtual machines, and thus without needing to package the virtual machine 525 into a virtual machine image 526.

In step 605, the transmission of virtual machines 525 and/or virtual machine images 526 to the installation device 520, when necessary, may be performed by transferring a virtual machine 525 between a first host (e.g., the virtual machine generator 530) and a second host (e.g., the installation device 520) via any computer network or other communication networks (e.g., telecommunication networks, cable networks, satellite networks, local wireless networks, etc.). In some cases, the transmission of virtual machines 525 and/or virtual machine images 526 may be performed using intermediary transportation devices, such as flash drives or other portable storage devices. For example, a virtual machine 525 may be exported as virtual appliance (e.g., image 526) and copied to a laptop computer or other transport device, for transportation of the virtual machine 525 to the installation device 520.

Figure 7:
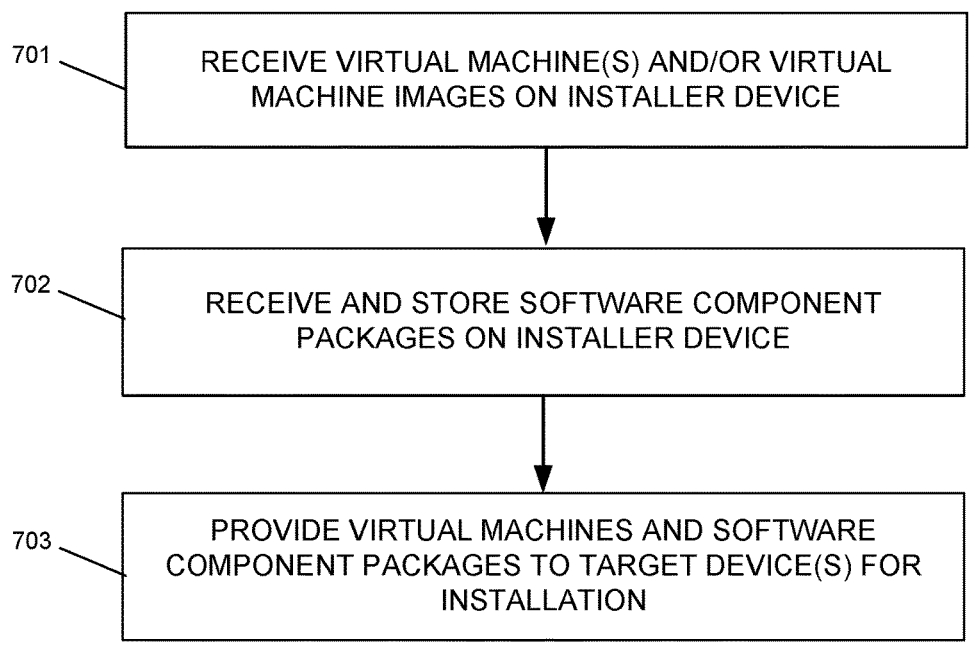
FIG. 7 is a flow diagram illustrating an example process of receiving virtual machines and software packages on an installation device, and providing the virtual machines to target devices to perform software installations, in accordance with one or more embodiments of the disclosure.

Referring now to FIG. 7, a flow diagram is shown illustrating an example process of receiving virtual machines and software packages on an installation device, and providing the virtual machines to target devices to perform software installations. As described below, the steps in this process may be performed by one or more devices/components in the computer network software installation system 500 described above, such as the installation device 520. However, it should be understood that the various features and processes described herein, including receiving, executing, and storing virtual machines and virtual machine images, and providing the virtual machines/images to target servers 510 to perform software installations, need not be limited to the specific computer systems and hardware implementations described above in FIGS. 1-5.

In step 701, an installation device 520 may receive and store one or more virtual machines 525 and/or virtual machine images 526. In some embodiments, step 701 may correspond to step 605, discussed above, in which a virtual machine generator device 530 transmits virtual machines to the installation device 520. As noted above, virtual machines 525 may be transferred between hosts, or may be packaged and transmitted as virtual machine images. As discussed below, installation device 520, unlike the virtual machine generator 530 may be capable of establishing a connection to the private network 515, and the virtual machines 525 and/or virtual machine images 526 may be used to perform software upgrades/installations for target servers 510 within the network 515. In some cases, the installation device 520 may receive and store multiple different virtual machines 525 and/or images 526 which are customized for software installations onto specific target servers 510. For example, a virtual machine 525 or image 526 may be configured with specific virtual hardware specifications, a guest operating system, firmware, and/or other software components, which corresponds to the actual hardware specifications, host operating system, firmware, and other software components of a particular target server 510. Additionally, as noted above, the installation device 520 may itself generate and configure virtual machines/images 525-526 in some embodiments, and thus step 601 need not be performed in such embodiments.

In step 702, the installation device 520 may receive and store one or more software component packages 527, corresponding to the software components to be installed on the target server(s) 510. The software component packages 527 may include an operating system, operating system update and/or security patch, an application update and/or security patch, a plug-in, add-on extension, etc. Also in step 702, the installation device 520 may configure the software component packages 527 for installation on one or more target devices 510. These software packages 527 may be stored in memory of the installation device 520 that is accessible to the guest operating system of the virtual machine(s) 525 executing on the installation device 520. Additionally, in some cases, the software packages 527 may be stored by and within the virtual machines 525 and/or images 526 themselves, in which case step 702 may be performed by a virtual machine generator 530 during the process of generating and configuring the virtual machines 525 (e.g., in steps 602-603).

In step 703, the installation device 520 may provide the virtual machines 525 (and/or virtual machine images 526), and the software component packages 527, to one or more target servers 510 within the network 515 onto which the software packages 527 are to be installed. In some embodiments, the network architecture and/or security features of the network 515 may prevent network communication between the target servers 510 and the installation device 520. Accordingly, in some cases, an Ethernet connection may be established between a target server 510 and installation device 520, for example, by coupling a Category 5 cable or the like to an Ethernet port of the target server 510. In other cases, communication links may be established using DSL/ADSL via Category 3 cables, T1, T3, or partial variants via Category 5 cable, and/or fiber optic cable. In such examples, the installation device 520 may be a portable installation device 520 such as a laptop or tablet computer that may transport virtual machines 525 to the physical location of the target server 510. In other examples, a flash drive or other portable storage device may be used to transfer virtual machines 525 and/or virtual machine images 526 directly onto target servers 510. In still other embodiments, secure network protocols may be used for establishing communication sessions between target servers 510 and the installation device 520, using the physical infrastructure of network 515. Such communication sessions may be made via direct connections between the device pair (510-520), or indirect connections through the network switch 512 and/or other intermediary network devices.

Figure 8:
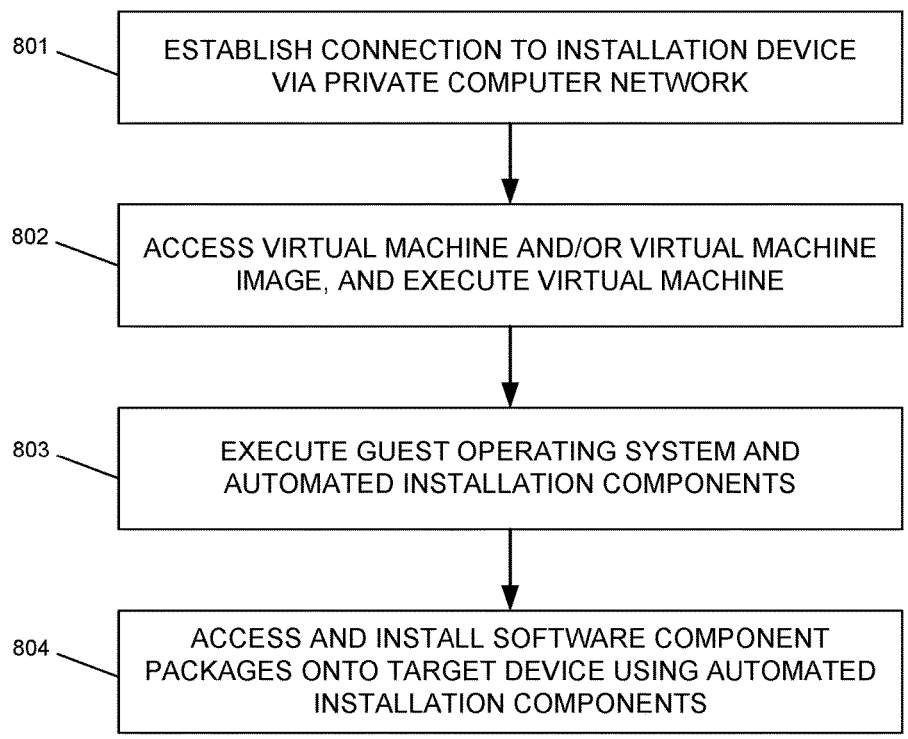
FIG. 8 is a flow diagram illustrating an example process of performing software installations at target devices using virtual machines on installation devices, in accordance with one or more embodiments of the disclosure.

Referring now to FIG. 8, another flow diagram is shown illustrating an example process of performing a software installation at a target server 510 using a virtual machines 525 on an installation device 520. As described below, the steps in this process may be performed by one or more devices/components in the computer network software installation system 500 described above, such as a particular target server 510 and/or installation device 520. However, it should be understood that the various features and processes described herein, including establishing the connection between the target device 510 and installation device 520, executing the virtual machine 525 and automated-installation components, and installing the software packages 527 onto the target device 510, need not be limited to the specific computer systems and hardware implementations described above in FIGS. 1-5.

In step 801, a connection may be established between a particular target server 510 and an installation device 520 having at least one virtual machine 525 or virtual machine image 526. In some embodiments, step 801 may correspond to step 703, discussed above, in which a connection is established between the installation device 520 and a target server 510. The connection established in step 801 may be initiated by either the target server 510, the installation device 520, or by a separate computer such as the network switch 512 and/or an administrator device of the private network 515. As noted above, the connection established in step 801 may be performed using the physical network infrastructure of the private network 515, or a separate infrastructure (e.g., a direct Ethernet connection using a Category 5 cable, etc.), or may involve transferring files/images via a portable storage device. In some cases, an indirect connection may be established by and through the network switch 512.

In step 802, the target server 510 may access a particular virtual machine 525 (or virtual machine image 526) on the installation device, and may initiate execution of the virtual machine 525. Then, in step 803, the guest operating system and the automated installation (AI) server components of the virtual machine 525 may be executed from within the virtual machine 525. As discussed above in reference to FIG. 6, a guest operating system and additional automated-installation server components may be downloaded and/or installed to the virtual machine 525, to configure the virtual machine 525 to function as an automated-installation (AI) server/appliance. These AI components may include, for example, a DHCP service, an automated installation service, an image packaging system (IPS) repository service, and/or custom installation scripts. Some or all of these AI components, and others, may be installed within or otherwise executed collaboratively with the virtual machine 525, to configure the virtual machine 525 to function as an AI server. A plurality of scripts and commands may be executed to customize the virtual machine 525 for a custom installation to one or more particular target devices 510. In other words, the steps result in the generation of an automated-installation server within the operating environment of the virtual machine 525. Because the virtual machine 525 is set up with an AI server, the virtual machine 525 is thus capable of performing automated installation of an operating system and/or related software packages and updates to the target device 510. Additionally, the auto-installation server components, and the guest operating system of the virtual machine 525 may be tailored to emulate one or more particular target serves 510. As such, when the target server 510 accesses the virtual machine 525 in step 802, the installation of the software packages may be initiated, and potentially may be performed quicker and with a reduced number steps because the virtual machine 525/installation appliance may emulate the target server 510, and thus does not require any additional steps, for example, to gain access to devices of the target network 515, or to determine and customize the installation according to the particular topology of the target server 510 and network 515.

In step 804, the software component packages 527 on the installation device 520 may be accessed and installed onto the target server 510, by the AI server components executing on the virtual machine 525. As discussed above, the installation device 520 that contains the virtual machine 525 (or virtual machine image 526) may be coupled to the target server 510 through a direct connection (e.g., Ethernet connection) or local network switch 512, thereby making the virtual machine 525 and its automated-installation server components accessible to the target server 510 and the target network 515. In some embodiments, the target server 510 connected to the installation device 520 may be the target device receiving the software packages 527 via the virtual machine 525, while in other embodiments, the target server 510 may be used to install the software packages 527 onto any network-based server or device within the target network 515.

In some embodiments, the target server 510 may include preboot execution environment (PXE) boot capability. The network of the virtual machine 515 may be set as a bridged adapter with a static IP, so that the host operating system of the installation device 520 (which is hosting and operating the virtual machine 525) may have its own network, and the virtual machine 525 may run on a 10.0.0.x network. In some embodiments, after connection is made between the installation device 520 and the target server 510, the target server 510 may be power cycled. Utilizing a port of the installation device 520, the software package 527 may be installed to the target server 510, in the same manner as installing a software package from a server on a remote network.

Although the example above is described in terms of a software installation onto a single target server 510, in some embodiments a plurality of target server 510 may receive and install software from the installation device simultaneously. In some cases, a single virtual machine 525 or virtual machine image 526 may be configured to initiate software installations on a plurality of target servers 510 simultaneously within the private network 515. In other cases, different virtual machines 525 and/or images 526 may be configured and customized to initiate software installations on different target servers 510 within the network 515, for example, based on different hardware profiles and capabilities, operating system platforms, and software applications, etc. As noted above, virtual machines 525 may be configured to emulate the network topology and hardware specifications on the target network 515 and/or target server 510, and the existing operating system on the target server 510 or network 515 may be installed as a guest operating system on the virtual machine 525. For example, a target device 510 requiring installation of a particular version of a particular operating system may require a virtual machine 525 or image 526 to be configured with a guest operating system comprising the operating system.

As noted above, software packages 527 may be obtained and stored separately from the virtual machines 525 and images 526 on the installation device. However, when the software installation is an operating system update or patch needed on a target server 510, such updates may be packaged within the virtual machine 525, which is running the same guest operating system as the host operating system of the target server 510. In such cases, when the virtual machine 525 is connected with the target server 510 in some form, the operating system updates/patches may be initiated with little preparation and configuration, because the updates have already been prepared using the same operating system and hardware specifications of the target server 510 (which have been emulated using the virtual machine 525). Additionally, in some cases, a shared directory may be implemented within the installation device 520, to allow sharing of filed between the host operating system and the guest operating system(s) running on the installation device 520.

When the software installation in step 604 is performed based on a virtual machine image 526, the virtual machine image first must be "woken up" (e.g., restarted for execution), either by the installation device 520, the target server 510, or another device on the network 515 (e.g., the switch 512). As noted above, virtual machine images 526 include all of the stored data necessary to be installed and executed as a virtual machine by a hypervisor or other virtual machine application. A hypervisor, or virtual machine monitor, includes a software and/or hardware module configured to create and run virtual machines. Thus, if the target server 510 includes a hypervisor, it may access and execute a virtual machine image 526 to perform the installation. In other cases, a hypervisor on the installation device 520 may be used. In some embodiments, the use of a virtual machine image (or virtual appliance) as an installation appliance (i.e., including automated-installation components), may potentially reduce installation and configuration steps for implementing installations within the target network 515. Such installation appliances 526 may be deployed as files, for example, using a file format such as open virtualization format (OVF). A virtual machine application running on devices 530, 520, and/or 510 may export and import virtual machines 525 using OVF. OVF is a cross-platform standard which allows for creating ready-made virtual machines 525 that can then be imported into a virtualizer of a virtual machine application 128. For example, a target server 510 including a virtual machine application 530 may perform a OVF import to access the a virtual machine 525, which may be supported from a manager window as well as a command-line interface at the target server 510. Such installation appliances (e.g., virtual machine images 526) allow for complete ready-to-use software packages (e.g., operating systems with applications) to be offered in such a way that no configuration or installation is needed, except for the importation of the installation appliances.

Such installation appliances (e.g., stored using OVF) may appear and be deployed to a target environment in various ways. For example, an installation appliance may comprise several files, as one or several images of a disk in a virtual disk file format and a textual description file in an XML dialect with an .ovf extension. In other examples, the files of an installation appliance may be packed together in a single archive file, possibly with an .ova extension. Files of an installation appliance (e.g., virtual machine image 526) may be compressed for easier transportation and storage. As noted above, in some embodiments, a target server 510 may already have a virtual machine application running on the device 510. In such cases, commands may be applied to the virtual machine application to export the installation appliance 526 from the installation device 520 to the target server 510. Additionally, it should be understood that several virtual machines 525 or installation appliances 526 may be combined into a larger OVF appliance. Larger OVF appliances containing multiple virtual machine images 526 may be used, for example, where the target network 515 includes different network topologies and requirements, or where multiple target networks 515 require installations at a remote restricted location.

Figure 9:
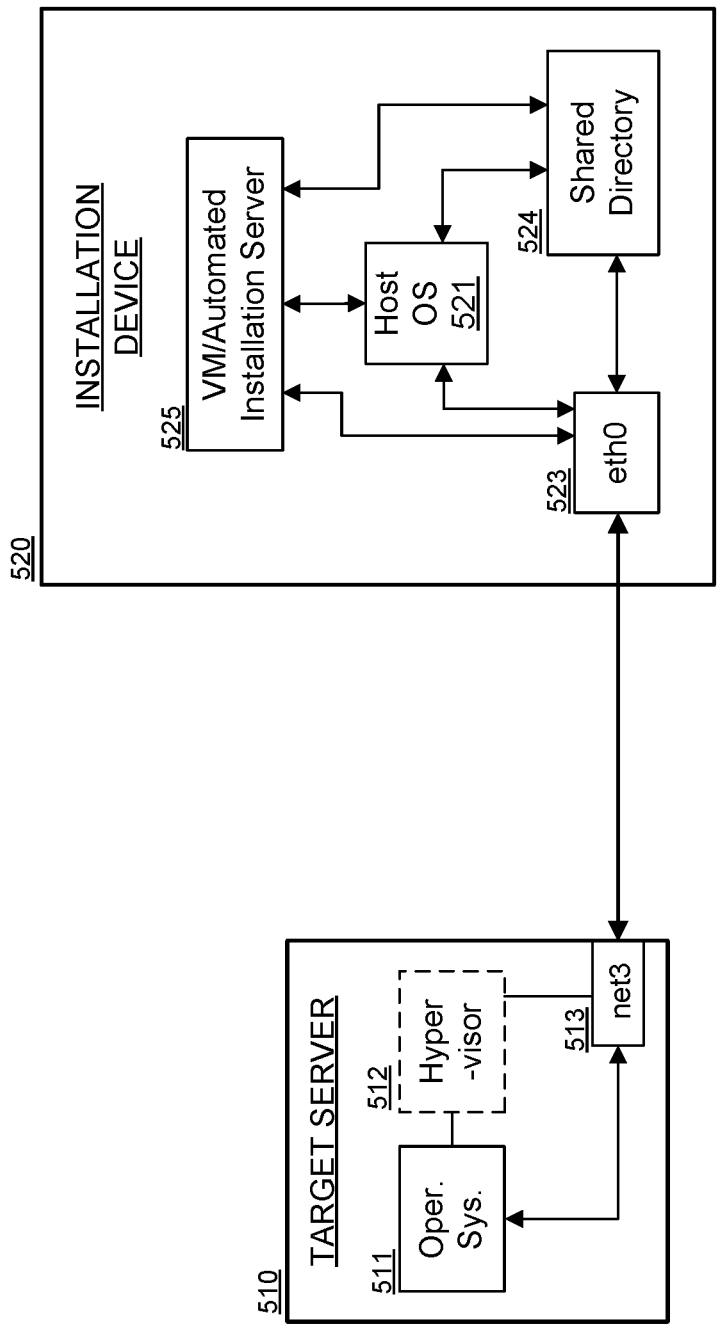
FIG. 9 is a block diagram illustrating an example physical connection between an installation device and a target device, in accordance with one or more embodiments of the disclosure.

Referring now to FIG. 9, a block diagram is shown illustrating an example of a physical connection between an installation device 520 and a target device 510 that may be used in certain embodiments. This example depicts a connection between an installation device 520 executing a virtual machine/AI server 525, and a device associated with a target network 515 (e.g., target server 510 or switch 512). As discussed above, the virtual machine 525 may be configured with components of an AI server and pre-packaged with an operating system and/or one or more associated software packages to be installed on one or more devices of the target network 515 (e.g., target server 510) The virtual machine 525 may run a guest operating system independent from the host operating system 521 of the device 520. A shared directory 524 may be created between the host operating system 521 and any guest operating systems of the virtual machine 525, so that files can be shared between the host operating system 521 and the guest operating systems of the virtual machine 525.

As shown in this example, the target server 510 may be coupled to installation device 520. In some embodiments, the target server 510 may be physically coupled to the installation device 520 using an Ethernet connection, such that an Ethernet port of device installation device 520 is physically connected to any one of the Ethernet ports of the target server 510 via, for example, a Category 5 cable. In some embodiments, a secure connection may be established between installation device 520 and target server 510, via a 10.0.0.x subnet network. A communicative link may be established between the host operating system 521 and guest operating system(s) of the virtual machine 525, using a loopback interface or a static IP on a subnet.

Once the connection shown in this example has been prepared, the target server 510 may be power cycled, and the target server 510 may then connect to the virtual machine 525 through a networking port in order to install a guest operating system prepackaged within the virtual machine 525, to the target network 515. Using virtual machine 525 in this manner, one or more devices of target network 515 may receive software patches, operating systems, or other software packages in automated fashion at the same time instead of having to perform manual installs at individual devices of target network 515 using, for example, compact discs or DVDs. As an example, using installation device 520, virtual machine 525 may be coupled to a network device (e.g., target device 510 or switch 512) of the target network 515, where the network device has access to numerous devices of target network 515 (e.g., through a private/secure/restricted Ethernet network) Thereafter, the network device (e.g., target device 510 or switch 512) may be power-cycled to initiate software updates to numerous devices within the target network 515. In other embodiments, multiple instances of the virtual machine 525 may be coupled to different devices within the target network 515 at the same time. In either case, using virtual machine 525, software updates may be deployed to various target devices 510 within the private network 515 securely and efficiently across numerous devices in a more secure fashion. Further, because the virtual machine 515 has been pre-programmed with auto-installation components, the updates to target servers 510 may be executed automatically with reduced need for operator intervention during installs.

Whether the virtual machine 525 is provided to target network 515 using an installation device 120 as shown in this example, or a portable storage device (e.g., a flash drive) or other device/appliance, the device/appliance (which may be off-line and isolated from public networks) can be inspected by the operator of target network 515 and passed through security checks, coupled to the target server 510 or other devices of target network 515, allowing field engineers or operators of target network 515 to update devices within the target network 515. The aforementioned may have particular advantages in mainframe and network data center embodiments, in which secure network access may be achieved while also keeping the systems of the target network 515 up to date without granting access to external systems updates via the Internet or unsecure networks external to the location of the mainframe network 515.

Additionally, using a virtual machine 525 as part of an installation appliance with an AI server enables automated installation of an operating system and/or related software packages to restricted network environments 515. Such techniques may reduce or eliminate the need for operators of the target network 515 to provide or have Internet access to install software or update the devices within the target network 515. Such embodiments also provide secure and controlled delivery of software packages to the target network 515. Additional technical advantages may include tighter control with respect to configuration of machines running at the target network 515, by ensuring which software packages (and what versions) may and may not be installed, as installations from the Internet may conflict with software currently executed by machines of target network 515, and such conflicts may cause systems issues which may lead to possible downtime of the target servers 510 or network infrastructure for repair. Finally, the technique advantages of the aforementioned embodiments include reduced need for setting up and configuring an installation server for each installation on a target network 515, which may result in inconsistencies, installation errors, or other complications.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A private network software installation system comprising:
    one or more target computing devices, wherein each said target computing device operates on a private network and does not have access to a public network; and
    an installation device, comprising:
        one or more network interfaces;
        a processing unit comprising one or more processors; and
        memory coupled with and readable by the processing unit and storing therein a set of instructions which, when executed by the processing unit, causes the installation device to:
            generate a virtual machine, using a virtual machine application executing on the installation device;

install a guest operating system on the virtual machine;

determine a set of software packages to be installed using the virtual machine;

select one or more automated installation software components, based on the software packages to be installed using the virtual machine;

install the selected one or more automated installation software components on the virtual machine;

package and store one or more virtual machine images within the memory of the installation device, each virtual machine image including the guest operating system and the selected one or more automated installation (AI) software components;

receive and store one or more software component packages within the memory of the installation device;

establish one or more connections with one or more target devices via the one or more network interfaces; and transmit the one or more virtual machine images, via the one or more network interfaces, to the one or more target devices.

2. The private network software installation system of claim 1, wherein each target device comprises an Ethernet port, and wherein the connections between the target devices and the installation device are made using the Ethernet ports of the target devices.

3. The private network software installation system of claim 1, the system comprising a plurality of target devices, wherein the installation device receives and stores a plurality of virtual machine images, wherein each of the plurality of target devices simultaneously accesses a different virtual machine image on the installation device.

4. The private network software installation system of claim 3, and wherein system further comprises a network switch configured as a point of access to the private network, wherein the plurality of virtual machine images are accessed by the plurality of target devices through the network switch.

5. The private network software installation system of claim 3, wherein each of the plurality of virtual machine images includes a set of parameters that correspond to a set of configuration settings that control the installation of the software component packages on a particular target device, and wherein different virtual machine images include different sets of configuration settings.

6. The private network software installation system of claim 3, wherein each particular target device of the plurality of target devices is configured to access the virtual machine image, execute the virtual machine, execute the guest operating system, and execute the automated installation (AI) software components by:

establishing the connection between the particular target device and the installation device via an Ethernet port; and power cycling the particular target device to initiate the steps of accessing the virtual machine image, executing the virtual machine, executing the guest operating system, and executing the automated installation (AI) software components.

7. The private network software installation system of claim 1, wherein the one or more software component packages installed on the target devices comprise at least one of an operating system upgrade or an operating system patch.

8. The private network software installation system of claim 1, wherein each of the one or more target devices includes a hypervisor, and wherein the virtual machine is executed by the hypervisor of the one or more target devices.

9. The private network software installation system of claim 1, wherein the installation device includes a hypervisor, and wherein the execution of the virtual machine by each particular target device of the one or more target devices comprises:

invoking, by the particular target device, the hypervisor of the installation device; and executing, by the particular target device, the virtual machine using the hypervisor of the installation device.

10. A method, comprising:

generating a virtual machine, using a virtual machine application executing on an installation device, the installation device comprising one or more processing units, one or more memory units, and a host operating system;

installing, by the installation device, a guest operating system on the virtual machine, wherein the guest operating system within the virtual machine is separate from the host operating system of the installation device;

determining a set of software packages to be installed using the virtual machine;

selecting one or more automated installation software components, based on the software packages to be installed using the virtual machine;

installing, by the installation device, the selected one or more automated installation software components on the virtual machine;

packaging, by the installation device, the virtual machine including the guest operating system and the selected automated installation software components into a virtual machine image;

storing, by the installation device, one or more software component packages within the one or more memory units of the installation device;

establishing, by the installation device, a connection with a target device, wherein the target device operates on a private network and is not connected to a public network; and transmitting, by the installation device, the virtual machine image, to the target device.

11. The method of claim 10, wherein establishing the connection with the target device and providing access to the virtual machine are performed via an Ethernet port of the target device.

12. The method of claim 10, further comprising:

generating one or more additional virtual machines on the installation device, each of the one or more additional virtual machines including a guest operating system and one or more automated installation (AI) software components;

establishing connections between the installation device and one or more additional target devices; and providing the one or more additional target devices with access to the one or more additional virtual machines, wherein the installation device provides the virtual machine to the target device while simultaneously providing the one or more additional virtual machines to the one or more additional target devices.

13. The method of claim 12, wherein the target device and the one or more additional target devices operate on a private network and do not have access to a public network, and wherein the installation device connects to a network switch configured as a point of access to the private network in order to provide access to virtual machines, to target devices within the private network.

14. The method of claim 12, wherein each of the virtual machine includes a set of parameters that correspond to a set of configuration settings that control the installation of the software component packages on a particular target device, and wherein different virtual machines include different sets of configuration settings.

15. The method of claim 10, wherein the installation device further includes a hypervisor, and wherein the method further comprises:
receiving, by the installation device and from the target device, a request to invoke the hypervisor of the installation device; and
executing, by the installation device, the virtual machine for the target device, using the hypervisor of the installation device.

16. One or more non-transitory computer-readable media, comprising computer-executable instructions, which when executed on a computer system comprising one or more processors, cause the computer system to:
generate a virtual machine, using a virtual machine application executing on the computer system;
install a guest operating system on the virtual machine, wherein the guest operating system within the virtual machine is separate from a host operating system of the computer system;
determine a set of software packages to be installed using the virtual machine;
select one or more automated installation software components, based on the software packages to be installed using the virtual machine;
install the selected one or more automated installation software components on the virtual machine;
package the virtual machine including the guest operating system and the selected automated installation software components into a virtual machine image;
store one or more software component packages within one or more memory units of the computer system;
establish a connection with a target device, wherein the target device operates on a private network and is not connected to a public network; and
transmit the virtual machine image, to the target device.

17. The non-transitory computer-readable media of claim 16, wherein the target devices includes a hypervisor, and wherein the virtual machine is executed by the hypervisor of the target device.

18. The non-transitory computer-readable media of claim 16, wherein the computer system includes a hypervisor, and wherein the execution of the virtual machine by the target device comprises:
invoking, by the target device, the hypervisor of the computer system; and
executing, by the target device, the virtual machine using the hypervisor of the computer system.

19. The non-transitory computer-readable media of claim 16, comprising further computer-executable instructions, which when executed on the computer system, cause the computer system to:
generate one or more additional virtual machines on the computer system, each of the one or more additional virtual machines including a guest operating system and one or more automated installation (AI) software components;
establish connections between the computer system and one or more additional target devices; and
provide the one or more additional target devices with access to the one or more additional virtual machines, wherein the computer system provides the virtual machine to the target device while simultaneously providing the one or more additional virtual machines to the one or more additional target devices.

20. The non-transitory computer-readable media of claim 19, wherein each of the virtual machine includes a set of parameters that correspond to a set of configuration settings that control the installation of the software component packages on a particular target device, and wherein different virtual machines include different sets of configuration settings.

* * * * *